(12) United States Patent
Yano et al.

(10) Patent No.: US 7,236,350 B2
(45) Date of Patent: Jun. 26, 2007

(54) SOLID ELECTROLYTIC CAPACITOR AND METHOD OF MANUFACTURING THE SAME

(75) Inventors: Mutsumi Yano, Hirakata (JP); Koichi Nishimura, Suita (JP); Takahisa Iida, Hirakata (JP); Mamoru Kimoto, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/396,581

(22) Filed: Apr. 4, 2006

(65) Prior Publication Data

US 2006/0268492 A1    Nov. 30, 2006

(30) Foreign Application Priority Data

May 31, 2005    (JP)    ............................. 2005-160281

(51) Int. Cl.
*H01G 9/04*    (2006.01)
*H01G 9/145*    (2006.01)
*H01G 4/06*    (2006.01)

(52) U.S. Cl. ...................... 361/528; 361/524; 29/25.03
(58) Field of Classification Search ................ 361/523, 361/524, 528, 529, 532; 29/25.03
See application file for complete search history.

(56) References Cited

U.S. PATENT DOCUMENTS

| 6,215,652 | B1 |   | 4/2001 | Yoshida et al. |   |
|---|---|---|---|---|---|
| 6,334,945 | B1 | * | 1/2002 | Lessner et al. | ............. 205/687 |
| 6,954,351 | B2 | * | 10/2005 | Konuma et al. | ............. 361/523 |

FOREIGN PATENT DOCUMENTS

| JP | 11-329902 | | 11/1999 |
| WO | WO 2005076297 | A1 * | 8/2005 |

\* cited by examiner

*Primary Examiner*—Eric W. Thomas
(74) *Attorney, Agent, or Firm*—NDQ&M Watchstone LLP; S. Peter Konzel (57) ABSTRACT

An anode includes a base body of a sintered porous material of niobium particles, a surface layer made of crystalline niobium oxide formed on the base body, and an anode lead having partly buried in base body 1a. A dielectric layer containing amorphous niobium oxide is formed by anodic oxidation on the cathode. An electrolyte layer made of polypyrrole is formed on the dielectric layer and a cathode is formed on the electrolyte layer. A conductive adhesive layer and cathode terminal are formed on an upper surface of the cathode. The anode lead exposed from the base body is connected to an anode terminal by welding. In addition, a mold resin is formed to cover the second conductive layer, the cathode terminal and the anode terminal so as to expose cathode terminal and an end of anode terminal.

7 Claims, 8 Drawing Sheets

BEFORE THERMAL OXIDATION

BASE BODY 1a

SURFACE LAYER 1b

BASE BODY 1a

AFTER THERMAL OXIDATION

SOLID ELECTROLYTIC CAPACITOR AND METHOD OF MANUFACTURING THE SAME

BACKGROUND OF THE INVENTION

1. Field of the Invention

The invention relates to solid electrolytic capacitors and methods of manufacturing the same.

2. Description of Related Art

Amorphous niobium oxide has received much attention as a dielectric material for next generation high-capacity solid electrolytic capacitors since it has high insulation and a high dielectric constant of about 1.8 times compared with tantalum oxide, which is employed for conventional solid electrolytic capacitors.

In a related art, solid electrolytic capacitors with niobium oxide are often influenced by heat-treatment such as reflow soldering processes. The stability of capacitance is inferior compared with solid electrolytic capacitors that employ other dielectric materials such as tantalum oxide. An improvement in this respect is shown in Japanese Published Unexamined Application No. 11-329902 discloses a solid electrolytic capacitor which has a formed niobium nitride region in the niobium oxide, which is a dielectric.

Figure 16:
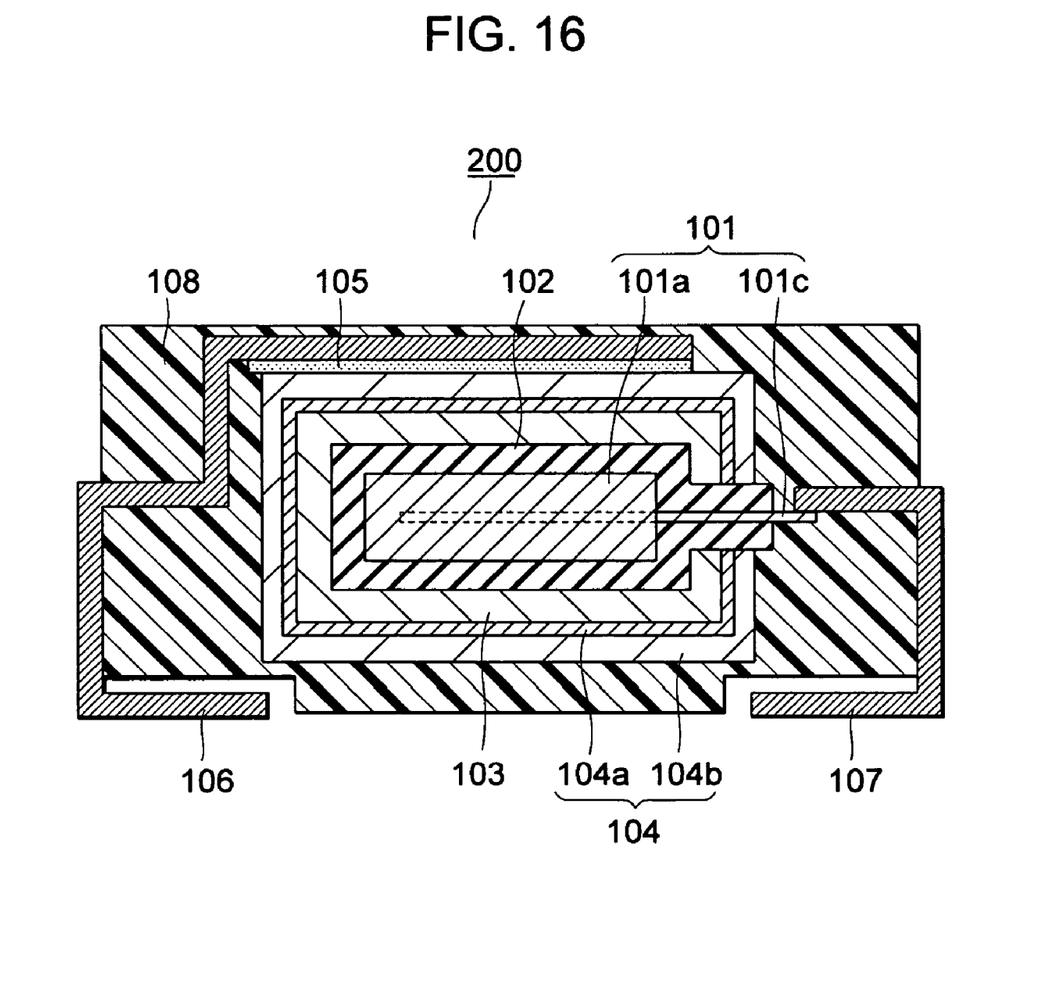
FIG. 16 shows a sectional view of a conventional rectangular solid-shaped solid electrolytic capacitor of related art.

FIG. 16 shows a sectional view of a representative structure of a conventional rectangular solid-shaped solid electrolytic capacitor. As shown in FIG. 16, a conventional solid electrolytic capacitor 200 has an anode 101, which includes a rectangular solid-shaped base body 101a made of a porous sintered body of niobium powder, and an anode lead 101c with one part buried in the base body 101a.

Dielectric layer 102 is made of amorphous niobium oxide and formed by anodic oxidation on the anode 101 to cover the anode 101. The dielectric layer 102 has a niobium nitride region.

In addition, an electrolyte layer 103 made of polypyrrole is formed on the dielectric layer 102 to cover the dielectric layer 102. On the electrolyte layer 103, a cathode 104 is formed to cover the electrolyte layer 103. The cathode 104 has a first conductive layer 104a made of the carbon paste formed to cover the electrolyte layer 103, and a second conductive layer 104b made of the silver paste formed to cover the first conductive layer 104a.

A conductive adhesive layer 105 is formed on the upper surface of the cathode 104, and a cathode terminal 6 is formed on the conductive adhesive layer 105. An anode lead 101c exposed from the base body 101a is connected to an anode terminal 107 by welding. In addition, a mold resin 108 is formed to cover the second conductive layer 104b, the cathode terminal 106 and the anode terminal 107 so as to expose cathode terminal 106 and an end of anode terminal 107. The solid electrolytic capacitor of related art 200 is composed as above.

As described above, since the niobium nitride region is formed in the dielectric layer 102, the conventional solid electrolytic capacitor 200 is somewhat resistant to heat-treatment process, such as reflow soldering processes. The capacity thus remains can be rather constant during these heat treatment processes.

However, a solid electrolytic capacitor that comprises the niobium oxide with a niobium nitride region as described above, is less resistant to heat treatment process. That is leakage current between the cathode and anode increases after heat-treatment process such as a reflow soldering process.

SUMMARY OF THE INVENTION

This invention alleviants the problem described above. An object of the invention is to provide a solid electrolytic capacitor capable of reducing leakage current.

To achieve the object, a solid electrolytic capacitor of an aspect of the present invention includes an anode having a surface layer that contains crystalline niobium oxide on a base body containing niobium, a dielectric layer with amorphous niobium oxide on the anode, and a cathode on the dielectric layer.

The solid electrolytic capacitor described above has a surface layer that includes crystalline niobium oxide which is formed between the base body that includes niobium, and a dielectric layer that includes amorphous niobium oxide. Such capacitor relieves the stress by expansion and shrinkage of its base body and dielectric layer during heat-treatment process, such as reflow soldering process. This structure thus prevents cracks at the interface between the anode and the dielectric layer. As a result, the solid electrolytic capacitor has reduced leakage current between the anode and the cathode.

Preferably, the surface layer of the solid electrolytic capacitor above, contains at least one of NbO and $NbO_2$. Since crystalline NbO and $NbO_2$ have electron conductivity, the conductivities of these materials are relatively high. Thus, equivalent series resistance (ESR) can be reduced to control the increase of the resistance between the anode and the cathode.

Preferably the ratio (D/d) between thickness of the surface layer (D) and the thickness of the dielectric layer (d) for the solid capacitor is less than 1.5 and more than 0.05. When the thickness of the surface layer (D) decreases, leakage current increases because the effect of relieving the stress induced in the heat-treatment process decreases. In addition, when the thickness of the surface layer (D) increases, ESR increases because the resistance between the anode and the cathode increases. Therefore, the ratio (D/d) (thickness of surface layer (D) vs. thickness of dielectric layer (d)) should be controlled to more than 0.05 to limit the ratio increased leakage current. On the other hand, setting ratio (D/d) less than 1.5 can reduce ESR. More preferably the ratio (D/d) desirably is less than 1.2 and more than 0.4 to reduce ESR.

A method of producing a solid electrolytic capacitor according to a second aspect of the present invention includes, forming a surface layer containing crystalline niobium oxide on a base body containing niobium, forming a dielectric layer containing amorphous niobium oxide on the anode, and forming a cathode on the dielectric layer.

According to a desirable method, the surface layer including crystalline niobium oxide on the base body is formed between the base body including niobium and the dielectric layer, which includes amorphous niobium oxide, is formed on the surface layer. By this process, the stress of expansion and shrinkage of the base body and the dielectric layer in heat-treatment process such as reflow soldering process are relieved, which prevents cracks at the interface between the anode and the dielectric layer. As a result, a solid electrolytic capacitor with reduced leakage current between the anode and the cathode can be manufactured easily.

In another aspect an oxidizing atmosphere is used in the method to produce the solid electrolytic capacitor by forming a surface layer with a heat-treatment process. For this, the surface layer of crystalline niobium oxide can be formed easily on the base body since the surface of the base body can be oxidized.

Preferably, in the method of the other aspect, the process of forming the surface layer includes forming a layer with amorphous niobium oxide on the base body, heat-treating the base body formed with a layer that includes amorphous niobium oxide in a non-oxidizing atmosphere. For this, since amorphous niobium oxide formed on the base body can be crystallized easily, the surface layer including crystalline niobium oxide can be formed on the base body easily.

In addition, preferably heat treatment uses a temperature of less than or equal to 1000° C. (degrees Celsius) yet more than 250° C. For this step, amorphous niobium oxide in the surface layer can be changed to crystalline $NbO_2$ since the amorphous niobium oxide on the base body can be crystallized and deoxidized moderately. The conductivity of crystalline $NbO_2$ is comparatively high. A solid electrolytic capacitor that has a smaller ESR can be produced easily by the method since the increase of resistance between the anode and the cathode is minimized.

DETAILED DESCRIPTION OF EMBODIMENTS

Various embodiments of the present invention will be described with reference to the accompanying drawings. The same or similar reference numerals are applied to the same or similar parts and elements throughout the drawings, and the description of the same or similar parts and elements will be omitted or simplified.

Prepositions, such as "on", "over" and "above" are defined with respect to a surface, for example a layer surface, regardless of that surface's orientation in space. The preposition "above" may be used in the specification and claims even if a layer is in contact with another layer. The preposition "on" may be used in the specification and claims if a layer is not in contact with another layer. For example, there is an intervening layer between them.

First Embodiment

Figure 1:
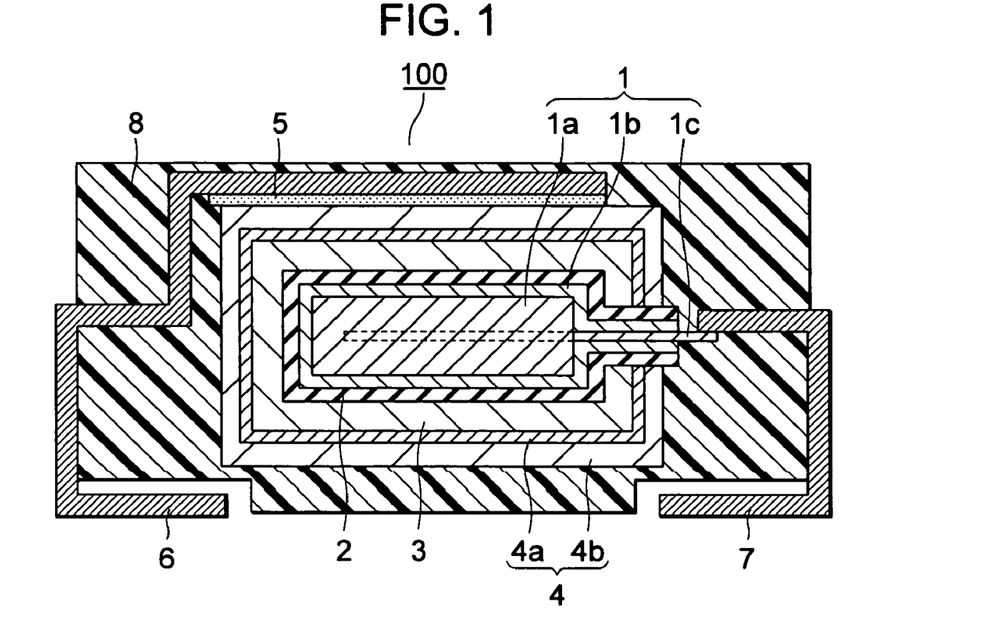
FIG. 1 shows a sectional view of representative structure of a rectangular solid-shaped solid electrolytic capacitor

FIG. 1 shows a sectional view of a representative structure of a rectangular solid-shaped solid electrolytic capacitor of the first embodiment according to the present invention.

As shown in FIG. 1, an anode 1 of the solid electrolytic capacitor 100 comprises a rectangular solid-shaped base body 1a of a sintered porous material of niobium particles. A surface layer 1b made of crystalline niobium oxide is formed on the base body 1a and covers the base body 1a. Also as shown in FIG. 1, anode lead 1c having partly buried in base body 1a.

A dielectric layer 2 made of amorphous niobium oxide is formed by anodic oxidation on the surface layer 1b and covers the surface layer 1b.

In addition, an electrolyte layer 3 made of polypyrrole is formed on the dielectric layer 2 thereby covering dielectric layer 2. And a cathode 4 is formed on the electrolyte layer 3 to cover the electrolyte layer 3. The cathode 4 includes a first conductive layer 4a made of carbon paste which is formed to cover the electrolyte layer 3, and a second conductive layer 4b made of silver paste which is formed to cover the first conductive layer 4a.

A conductive adhesive layer 5 is formed at the upper portion of the cathode 4, and a cathode terminal 6 is formed on the conductive adhesive layer 5. An anode terminal 7 is connected to exposed anode lead 1c from the base body 1a by welding. In addition, a mold resin 8 is formed to cover the second electrically conductive layer 4b, the cathode terminal 6, and the anode terminal 7. The end of the cathode terminal 6 and the end of the anode terminal 7 are drawn outside from the mold resin 8. The solid electrolytic capacitor 100 of the first embodiment of the present invention is comprised as above.

FIGS. 2 to 6 show sectional views of a rectangular solid-shaped solid electrolytic capacitor of the first embodiment according to the present invention shown in FIG. 1 for explaining a production process of the solid electrolytic capacitor. The method of producing a solid electrolytic capacitor of the first embodiment according to the present invention will be explained with reference to FIGS. 2 to 6.

Figure 2:
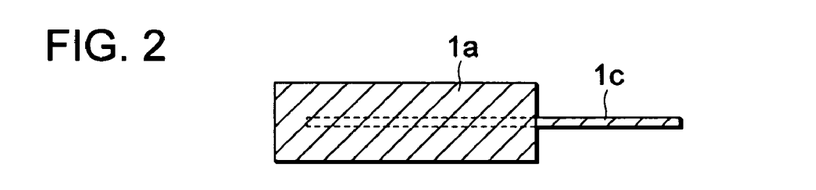
FIGS. 2 to 6 show sectional views of a rectangular solid-shaped solid electrolytic capacitor made by a method according to an embodiment.

At first, as shown in FIG. 2, the base body 1a made of sintered porous material formed by sintering a powder body made of niobium particles. A part of anode lead 1c is buried in the base body 1a.

Figure 3:
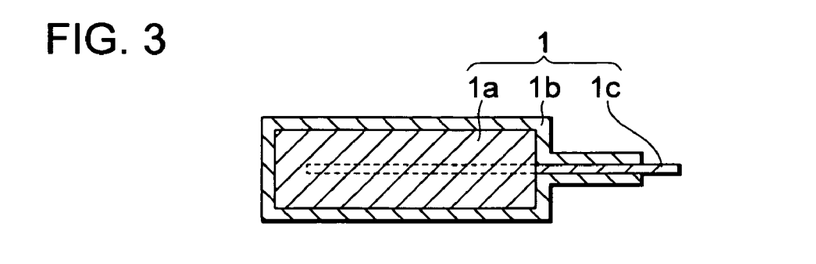

As shown in FIG. 3, the surface of the base body 1a is oxidized by heat-treating the base body 1a in an oxidizing atmosphere such as air. Air is an example of "an oxidizing atmosphere" of the present invention. Surface layer 1b made of crystalline niobium oxide is formed on the base body 1a to cover the base body 1a. As a result, the anode 1 including the base body 1a, the surface layer 1b made of crystalline niobium oxide, and the anode lead 1c is prepared.

Figure 4:
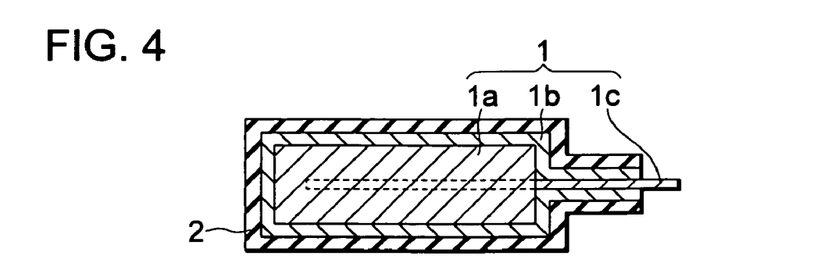

As shown in FIG. 4, the dielectric layer 2 made of amorphous niobium oxide is formed on surface layer 1b to cover surface layer 1b by anodic oxidation of the anode 1 in a water solution such as a phosphoric acid water solution.

Figure 5:
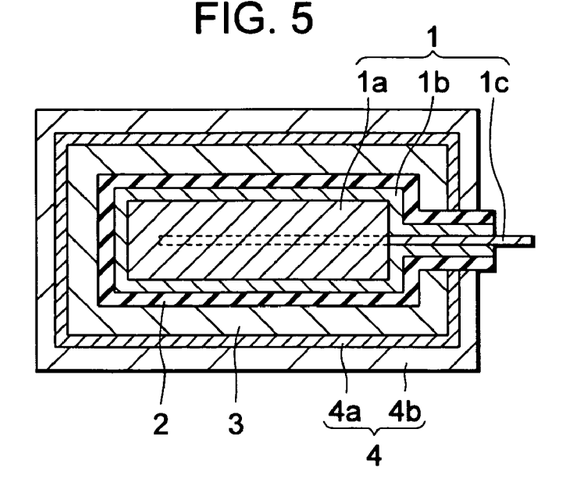

After forming the dielectric layer 2, as shown in FIG. 5, an electrolyte layer 3 including polypyrrole is formed by polymerizing on the dielectric layer 2 to cover the dielectric layer 2. In addition, a carbon paste and a silver paste are applied and dried sequentially on electrolyte layer 3 to cover the electrolyte layer 3. Then cathode 4, which include first conductive layer 4a made of the carbon paste and second conductive layer 4b made of silver paste, is formed.

Figure 6:
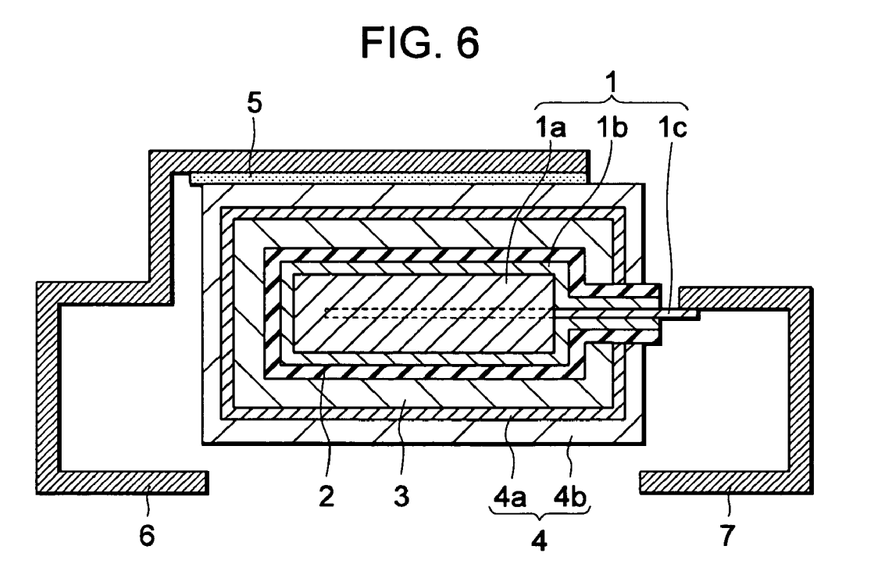

As shown in FIG. 6, after applying conductive adhesive to the surface of a cathode terminal 6, cathode 4 is in contact with cathode terminal 6 through the conductive adhesive. Then, the conductive adhesive is dried while applying pressure to cathode 4 and cathode terminal 6. Anode terminal 7 is connected to anode lead 1c by welding. Finally, mold resin 8 is formed to cover the second conductive layer 4b, cathode terminal 6 and anode terminal 7. Cathode terminal 6 and an end of anode terminal 7 are exposed outside of mold resin 8. This procedure creates solid electrolytic capacitor 100 of the first embodiment according.

In an embodiment, surface layer 1b, which made of crystalline niobium oxide, is formed between niobium base body 1a and dielectric layer 2, the latter of which is made of amorphous niobium oxide. In this formed structure, the stress by the expansion and shrinkage to the base body 1a and dielectric layer 2 from heat-treatment (such as a reflow soldering process) is minimized. Furthermore cracks at the interface between anode 1 and dielectric layer 2 are prevented. As a result, a solid electrolytic capacitor capable of reducing leakage current between the anode 1 and the cathode 4 can be realized.

In addition, according to an embodiment, the surface of the base body 1a is oxidized by heat-treating the niobium base body 1a in an oxidizing atmosphere and then anode 1 (including the surface layer 1b made of crystalline niobium oxide) is formed. In this way, surface layer 1b, which relieves stress by expansion and shrink of the base body 1a and the dielectric layer 2 in heat-treatment such as reflow soldering process, is formed easily. As a result, a solid electrolytic capacitor capable of preventing cracks at the interface between the anode 1 and the dielectric layer 2 and reducing leakage current between the anode 1 and the cathode 4 can be produced easily.

Heat-treatment preferably is carried out in air. But the invention is not limited to this. For example, the "air" may include an atmosphere including oxygen with such as nitrogen gas or non-activated gas. Furthermore, a vacuum, partial vacuum may include gaseous components.

The Second Embodiment

Figure 7:
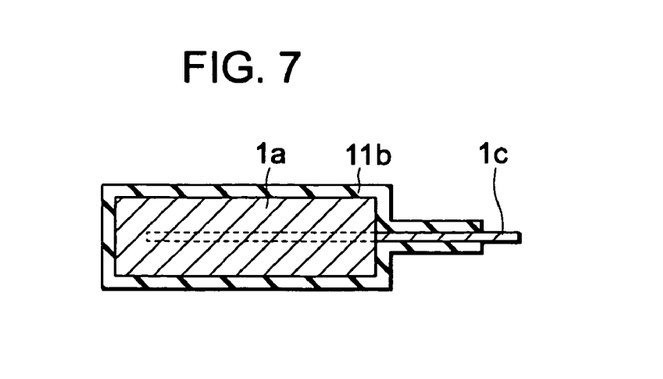
FIG. 7 shows a sectional view of a rectangular solid-shaped solid electrolytic capacitor according to an embodiment.

FIG. 7 shows a sectional view of a rectangular solid-shaped solid electrolytic capacitor of the second embodiment according to the present invention. The second embodiment method has steps (i) forms a layer that includes amorphous niobium oxide on the niobium base body, and then (ii) forms a surface layer including crystalline niobium oxide by heat-treating the layer. These steps differ from the first embodiment. A method of producing a solid electrolytic capacitor according to the second embodiment will now be explained in the detail with reference to FIGS. 2 to 7.

At first, as shown in FIG. 2, base body 1a made of a sintered porous is formed by sintering a powder body made of niobium particles. A portion of anode lead 1c is buried in base body 1a.

Next, as shown in FIG. 7, a layer 11b made of amorphous niobium oxide by anodic oxidizing of the base body 1a in a water solution such as phosphoric acid water solution so that the layer 11b covers the base body 1a.

After that, the base body 1a forms layer 11b which is made of amorphous niobium oxide on its surface by heat-treating, for example, in a non-oxidizing atmosphere under reduced pressure. This process crystallizes and deoxidizes the amorphous niobium oxide in layer 11b. In this way, layer 11b made of the amorphous niobium oxide changes to surface layer 1b made of crystalline niobium oxide.

Other processes following the process above can be applied in the same manner as desirable for the first embodiment as shown in FIGS. 4 to 6. That is, a dielectric layer 2 made of amorphous niobium oxide, an electrolyte layer 3 including polypyrrole, and a cathode 4, that includes a first conductive layer 4a made of the carbon paste and a second conductive layer 4b made of silver paste are formed sequentially. Furthermore, a cathode terminal 6 is connected with a cathode terminal 6 through a conductive adhesive layer 5, and an anode lead 1c is connected with an anode terminal 7. Finally, a mold resin 8 is formed to cover the second conductive layer 4b, the cathode terminal 6 and the anode terminal 7. The cathode terminal 6 and an end of anode terminal 7 are exposed outside of the mold resin 8. In this way the solid electrolytic capacitor 100 of the second embodiment according to the present invention is prepared.

In the second embodiment, the layer 11b made of the amorphous niobium oxide is crystallized to form the surface layer 1b, which is made of crystalline niobium oxide. In this way the surface layer 1b, which can relieve stress by expansion and shrink of the base body 1a and the dielectric layer 2 in heat-treatment such as reflow soldering process, is easily formed. As a result, a solid electrolytic capacitor capable of preventing cracks at the interface between the anode 1 and the dielectric layer 2 and reducing leakage current between the anode 1 and the cathode 4 can be produced easily.

The heat-treatment of the embodiment is carried out under reduced pressure. But the invention is not limited to this. For example, the atmosphere may include nitrogen gas or non-activated gas if the atmosphere does not include or includes an extremely small amount of oxygen. The heat treatment also can include a pressure atmosphere.

In the first and second embodiment, the surface layer 1b is made of crystalline niobium oxide. But, the invention is not limited to this. For example, the surface layer 1b may include crystalline niobium oxide with amorphous niobium oxide or/and niobium metal.

In the first and second embodiments, a sintered porous material of niobium is employed as the base body 1a. But, the invention is not limited to this. For example, the base body 1a may contain niobium and metal materials such as, but not limited to, aluminum, tantalum, or titanium. Alternatively the base body 1a may contain a niobium alloy including the above metal materials. In addition, the base body 1a may be film-shaped instead of a sintered porous morphology.

In the first and second embodiment, polypyrrole is employed as the electrolyte layer 3. But, the invention is not limited to this. For example, a conductive polymer such as poly thiophene, or other conductive materials such as manganese dioxide may be employed.

In the first and second embodiment, a lamination structure of the first conductive layer 4a and the second conductive layer 4b is employed as the cathode 4. But, the invention is not limited to this. For example, a single layered structure that contains only the first conductive layer 4a or the second electrically conductive layer 4b may be employed.

EXAMPLE 1

In example 1, a solid electrolytic capacitor is prepared for evaluation of leakage current and ESR between the anode lead and the cathode.

Figure 8:
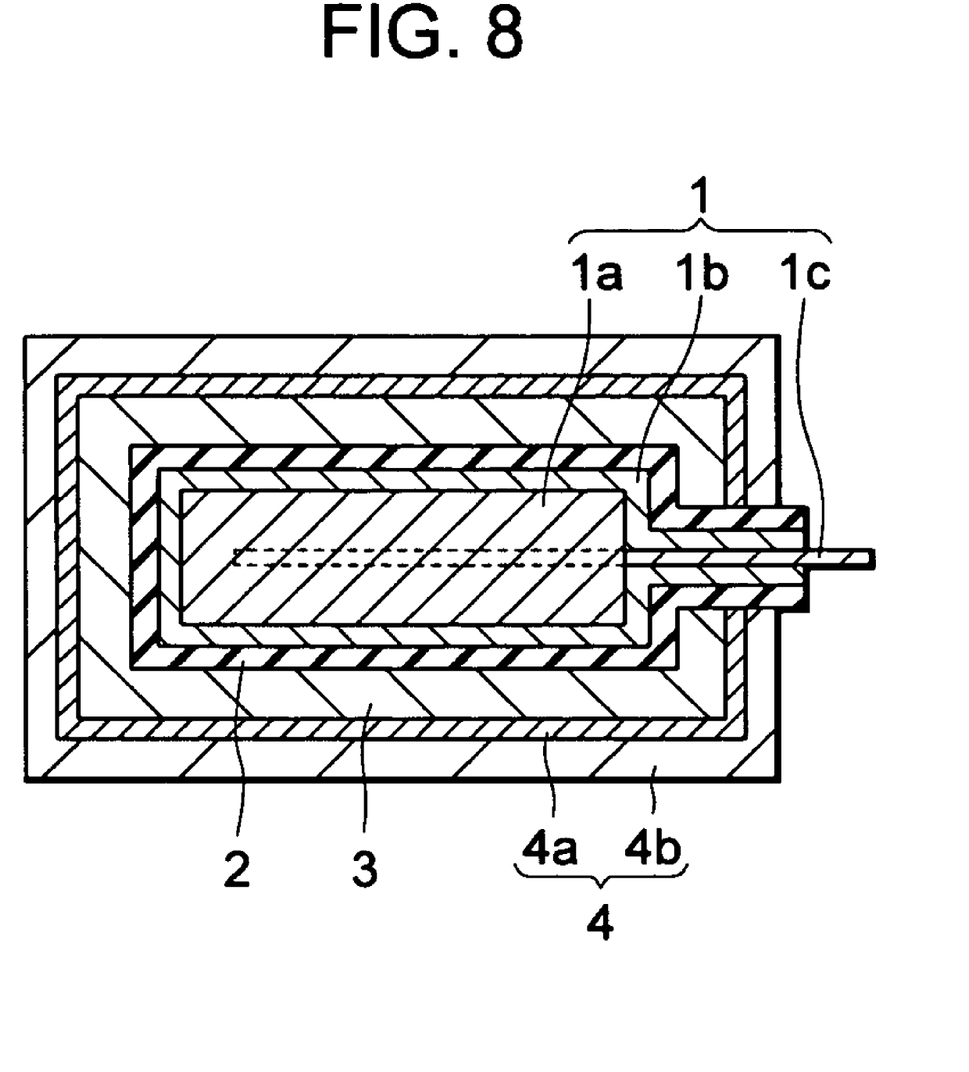
FIG. 8 shows a sectional view of representative structure of a rectangular solid-shaped solid electrolytic capacitor of example 1.

FIG. 8 shows a sectional view of a rectangular solid-shaped solid electrolytic capacitor of example 1 according to the present invention. In example 1, the solid electrolytic capacitor A1 shown in FIG. 8 is produced by the method below.

At first, a rectangular solid-shaped base body 1a of sintered porous materials dimensions with about 1.7 mm×about 3.3 mm×about 2.7 mm is made by sintering in vacuum a powder body made of niobium particles of about 1 μm size. Then, a part of the anode lead 1c is buried in the base body 1a. The base body 1a is oxidized by heating the base body 1a by about 350° C. temperature for about 30 minutes in air. The heat temperature in the oxidation process from a furnace employed in the oxidation is measured by a thermocouple installed near a sample holding jig in the furnace. The surface layer 1b, made of crystalline niobium oxide, is formed on the base body 1a to cover the base body 1a, and the anode including the base body 1a, the surface layer 1b, and the lead 1c is prepared.

Next, anode 1 is oxidized by about 10V constant voltage in a phosphoric acid water solution of about 0.1 wt % which is held at about 60° C. for about 10 hours. By this method, the dielectric layer 2 made of amorphous niobium oxide is formed on the surface layer 1b to cover the surface layer 1b.

Next, the electrolyte layer 3 made of polypyrrole is formed by polymerizing on the dielectric layer 2 to cover the dielectric layer 2. In addition, carbon paste is applied on the electrolyte layer 3 to cover the electrolyte layer 3. The first conductive layer 4a made of carbon paste is formed by drying the applied carbon paste at about 80° C. for about 30 minutes. After that, silver paste is applied on the first conductive layer 4a to cover the first conductive layer 4a, and the second conductive layer 4b is formed by drying the applied silver paste by about 170° C. for about 30 minutes. The cathode 4 including the first conductive layer 4a and the second conductive layer 4b is formed to cover the electrolyte layer 3. In this way, the solid electrolytic capacitor A1 of example 1 according to the present invention is prepared.

Figure 9A:
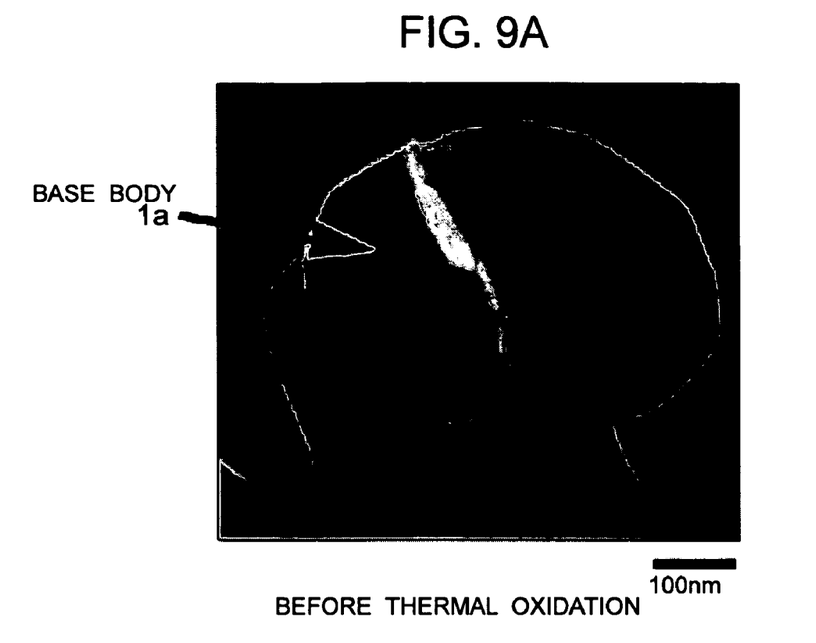
FIGS. 9A and 9B are cross-sectional SEM photographs of an anode before and after oxidation from example 1.
Figure 9B:
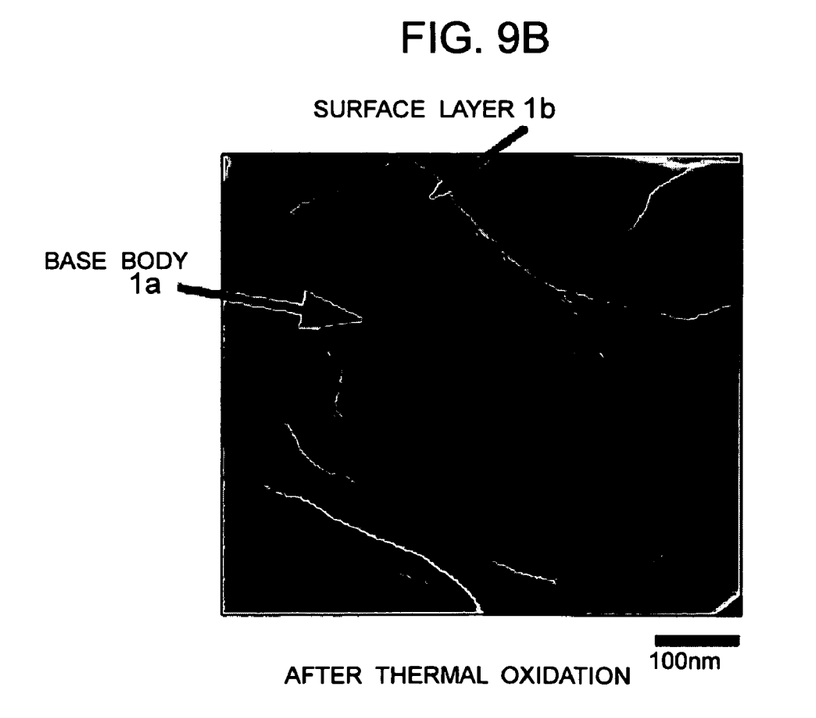

FIGS. 9A and 9B are SEM (Scanning Election Microscope) photographs showing the section of anode before and after oxidation for example 1 of the present invention. As shown in FIG. 9B, surface layer 1b having about 40 nm thickness is formed on the base body 1a to cover the base body 1a by the oxidation.

Figure 10:
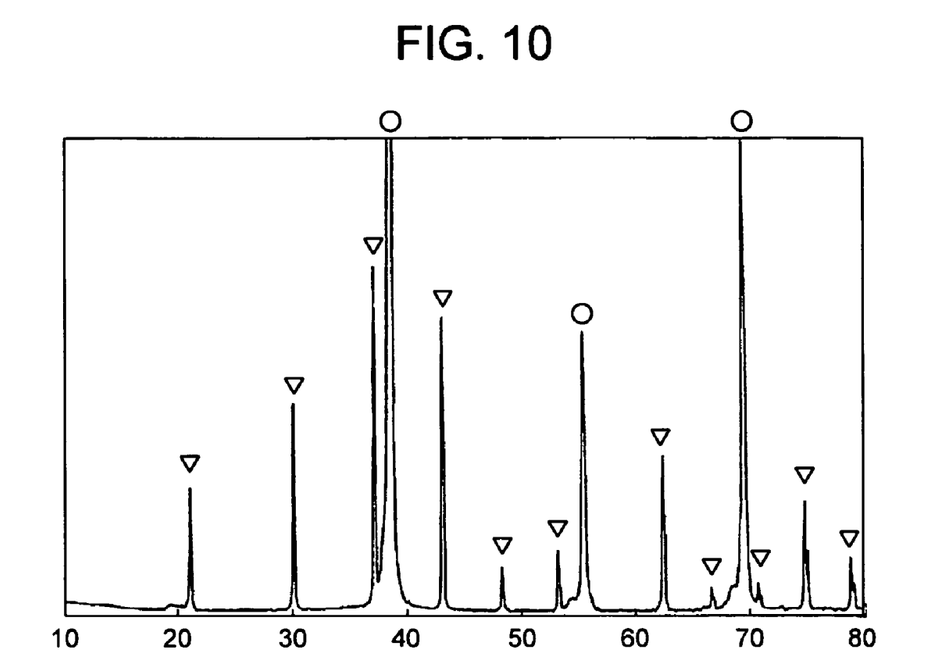
FIG. 10 is an X-ray diffraction pattern of anode 1 after oxidation from example 1.

Anode 1 is evaluated after oxidation but before anodic oxidation in example 1 by X-ray diffraction using a Cu—Kα ray. FIG. 10 is an X-ray diffraction pattern of anode 1 after the oxidation of example 1 according to the present invention. The peak positions marked "○" correspond to niobium metal (Nb), and the peak positions marked "▽" correspond to niobium oxide (NbO). As shown in FIG. 10, after oxidation, anode 1 has a peak of crystalline niobium metal (Nb) and a peak of niobium oxide (NbO). Peaks of niobium metal (Nb) are considered to be caused by the base body 1a. From the analysis of the result of FIGS. 9 and 10, the surface layer 1b of anode 1 after the oxidation of the example 1 is considered to include crystalline niobium oxide (NbO).

A section of anode 1 and the dielectric layer 2 is examined by a transmission electron microscopy (TEM) after disassembling the solid electrolytic capacitor A1. A composition analysis, via electron energy-loss spectroscopy (EELS) and crystalline evaluation via the electron beam diffraction are carried out.

Results shows that surface layer 1b made of crystalline niobium oxide (NbO) with about 21 nm thickness formed on the base body 1a, covering the base body 1a of the solid electrolytic capacitor A1. Furthermore, dielectric layer 2 made of about 25 nm thickness amorphous niobium oxide ($Nb_2O_5$) formed on surface layer 1b, thereby covering the surface layer 1b.

COMPARATIVE EXAMPLE 1

In comparative example 1A, a solid electrolytic capacitor X1 is produced by the method of example 1 without carrying out the heat oxidation process of the base body. In other words, the anode of solid electrolytic capacitor X1 of comparative example 1 consists of only the base body and a dielectric layer forms directly on the base body.

Figure 11:
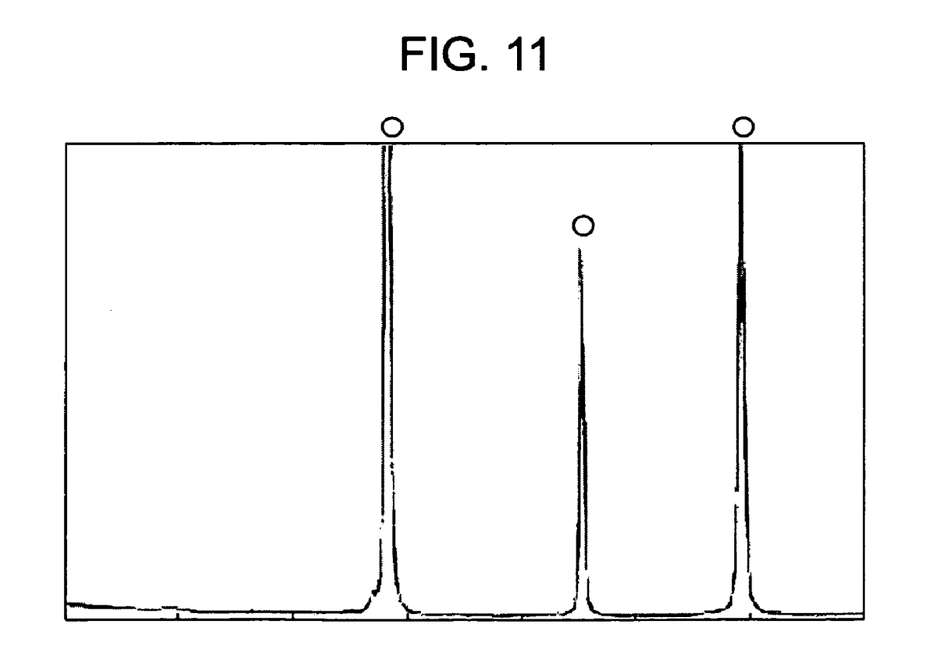
FIG. 11 is an X-ray diffraction pattern of anode 1 after oxidation of the comparative example 1.

The anode 1 before anodic oxidation in comparative example 1 is evaluated by X-ray diffraction using Cu—Kα ray. FIG. 11 is an X-ray diffraction pattern of anode 1 after oxidation of comparative example 1. The peak positions marked "○" correspond to niobium metal (Nb). As shown in FIG. 11, anode 1 does not have peaks of niobium oxide (NbO) compared to FIG. 10. From this analysis, it is seen that the anode (base body) of the comparative example 1 consists of niobium metal (Nb), and does not include crystalline niobium oxide (NbO).

Furthermore, the section of the anode and the dielectric layer is observed by transmission electron microscopy (TEM) after disassembled the solid electrolytic capacitor X1. Composition analysis is carried out by electron energy-loss spectroscopy (EELS) and crystalline evaluation is made by the electron beam diffraction.

Results show that the dielectric layer 2 is formed of amorphous niobium oxide ($Nb_2O_5$) of about 25 nm thickness on the base body, thereby covering the base body.

EXAMPLE 2

In example 2, the solid electrolytic capacitor A2 is produced in the same manner as in example 1 except that heat oxidation of the base body 1a occurred at about 390° C. temperature for about 60 minutes instead of at about 350° C. temperature for about 30 minutes in the method of example 1.

Figure 12:
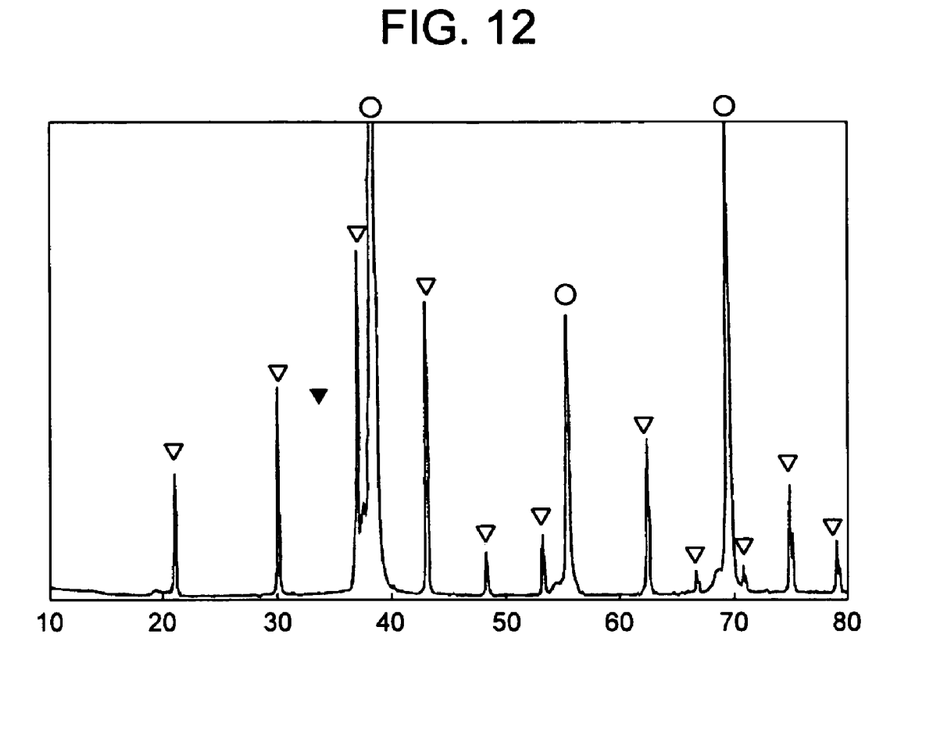
FIG. 12 is an X-ray diffraction pattern of anode 1 after oxidation from example 2.

The anode 1 after the heat oxidation but before the anodic oxidation of the example 2 is evaluated by X-ray diffraction using Cu—Kα ray. FIG. 12 is an X-ray diffraction pattern of anode 1 after oxidation of example 2 according to the present invention. The peak positions marked "○" correspond to niobium metal (Nb), the peak positions marked "▽" corresponds to niobium oxide (NbO), and a peak position marked "▼" corresponds to niobium oxide ($Nb_6O$). As shown in FIG. 12, anode 1 has peaks of crystalline niobium metal (Nb) and a peak of niobium oxide (NbO and $Nb_6O$). A peak of niobium metal (Nb) is considered to be caused by the base body 1a.

Furthermore, a section of the anode 1 and of the dielectric layer 2 is observed by using a transmission electron microscopy (TEM) after disassembling solid electrolytic capacitor A2 in the same manner as the example 1. Composition analysis via electron energy-loss spectroscopy (EELS) and crystalline evaluation via the electron beam diffraction also are carried out.

Results show that the surface layer 1b of about 70 nm in thickness is formed on the base body 1a, thereby covering the base body 1a of the solid electrolytic capacitor A2. In addition, the surface layer 1b is found to include crystalline niobium oxide (NbO and $Nb_6O$) from X-ray diffraction. And also the dielectric layer 2 made of amorphous niobium oxide ($Nb_2O_5$) having about 25 nm in thickness is formed on the surface layer 1b to cover the surface layer 1b.

(Evaluation 1)

After heating solid electrolytic capacitors (A1, A2, and X1) to about 250° C. temperature for about 10 minutes in air, about 5V voltage is applied to the anode lead and the cathode of each solid electrolytic capacitor to measure a leakage current after about 20 seconds from applying the voltage. The results are shown in table 1. Table 1 shows measured values of the leakage current for each solid electrolytic capacitor and indexes of the leakage current when the index of the leakage current in the solid electrolytic capacitor X1 of the comparative example 1 is "100".

In addition, the temperature need for oxidation as applied by a furnace is measured by a thermocouple installed near a sample maintenance jig in the furnace.

TABLE 1

| Solid Electrolytic Capacitor | Leakage Current (μA) | (Index) |
|---|---|---|
| A1 | 500 | 25 |
| A2 | 1000 | 50 |
| X1 | 2000 | 100 |

From these results, it is understood that solid electrolytic capacitors A1 and A2 from example 1 and 2, respectively have surface layer 1b made of crystalline niobium oxide on the base body 1a, which improves greatly reduce the leakage current as compared with comparative example 1. Also the leakage current of the solid electrolytic capacitor A1 is smaller than that of the solid electrolytic capacitor A2. From this result, it is preferred that the surface layer 1b of anode 1 does not contain crystalline niobium oxide ($Nb_6O$).

EXAMPLE 3

In example 3, solid electrolytic capacitors B1 to B10 are produced in the same manner as the method of the example 1 except that the heat temperature used for the oxidation process of base body 1a are: about 240° C. temperature (B1), about 250° C. temperature (B2), about 265° C. temperature (B3), about 280° C. temperature (B4), about 330° C. temperature (B5), about 360° C. temperature (B6), about 370° C. temperature (B7), about 375° C. temperature (B8), about 380° C. temperature (B9), and about 385° C. temperature (B10), instead of 350° C. temperature as used in the method of example 1.

A section of anode 1 and of dielectric layer 2 is observed by transmission electron microscopy (TEM) after disassembling each solid electrolytic capacitor (B1 to B10) in the same manner as the example 1. Composition analysis by electron energy-loss spectroscopy (EELS) and crystalline evaluation by electron beam diffraction also are carried out.

Results show that the surface layer 1b made of crystalline niobium oxide (NbO) formed on the base body 1a, thereby covering the base body 1a of the each solid electrolytic capacitor B1 to B10. And also the dielectric layer 2 made of amorphous niobium oxide ($Nb_2O_5$) formed on the surface layer 1b, thereby covering the surface layer 1b.

In addition, thickness of the dielectric layer 2 (D) and the thickness of the surface layer 1b (d) are measured by TEM observation, respectively, for each solid electrolytic capacitor (B1 to B10), and thickness ratios (D/d) are calculated.

(Evaluation 2)

After heating solid electrolytic capacitors B1 to B10 to about 250° C. temperature in air for about 10 minutes, about 5V voltage is applied to each anode lead and cathode of each solid electrolytic capacitor to measure leakage current after about 20 seconds from applying the voltage. Furthermore, the equivalent series resistance (ESR) to about 100 kHz frequency (applying the voltage between the anode lead 1c and the cathode 4) is measured with an LCR meter.

Results are shown in table 2. Table 2 shows measured values of leakage current and ESR for each solid electrolytic capacitor and indexes of leakage current solid electrolytic capacitor X1 of the comparative example 1 is "100". Table 2 also shows indexes of ESR when indexes of the ESR in the solid electrolytic capacitor X1 of the comparative example 1 is "100".

In addition, the temperature used in a furnace is measured by a thermocouple installed near a sample holding jig in the furnace.

TABLE 2

| Capacitors | D (nm) | d (nm) | D/d | Leakage Current (μA) | (index) | ESR (μΩ) | (index) |
|---|---|---|---|---|---|---|---|
| B1 | 0.5 | 25 | 0.02 | 1750 | 87.5 | 19.8 | 99 |
| B2 | 1.3 | 25 | 0.05 | 550 | 27.5 | 19.6 | 98 |
| B3 | 6.0 | 25 | 0.24 | 520 | 26.0 | 19.6 | 98 |
| B4 | 10.0 | 25 | 0.40 | 516 | 25.8 | 19.0 | 95 |
| B5 | 16.0 | 25 | 0.64 | 506 | 25.3 | 19.0 | 95 |
| A1 | 21.0 | 25 | 0.84 | 500 | 25 | 18.8 | 94 |
| B6 | 25.0 | 25 | 1.00 | 500 | 25 | 19.0 | 95 |
| B7 | 30.0 | 25 | 1.20 | 500 | 25 | 19.0 | 95 |
| B8 | 37.5 | 25 | 1.50 | 500 | 25 | 19.8 | 99 |
| B9 | 43.8 | 25 | 1.75 | 500 | 25 | 21.0 | 105 |
| B10 | 50.0 | 25 | 2.00 | 500 | 25 | 21.4 | 107 |
| X1 | — | 25 | — | 2000 | 100 | 20.0 | 100 |

These results show that the leakage currents of the solid electrolytic capacitors B1 to B10 of the example 2 are smaller than that to the solid electrolytic capacitor X1 of comparative example 1. In addition, it is also seen that the leakage current steeply increases when the ratio (D/d) of thickness of the dielectric layer 2 (D) and the surface layer 1b (d) is smaller than 0.05.

Furthermore, it is seen that the solid electrolytic capacitors B1 to B8 which have ratios (D/d) of thickness of the dielectric layer 2 (D) and the surface layer 1b (d) are less than 1.5 have smaller ESR compared with that of the solid electrolytic capacitor X1. It is also seen that the solid electrolytic capacitors B9 and B10 which have ratios (D/d) of thickness of the dielectric layer 2 (D) and the surface layer 1b (d) are more than 1.5 have larger ESR compared with that of the solid electrolytic capacitor X1. On the other hand, it is understood that ESR is reduced in less than 95% of the solid electrolytic capacitor X1 of comparative example 1 if the thickness ratio (D/d) is in a range of less than or equal to 1.2 and more than or equal to 0.4. In this way, setting the ratio (D/d) with the thickness of the surface layer 1b (d) and thickness of the dielectric layer 2(D) more than or equal to 0.05 and less than or equal to 1.5 is preferable. More preferably, the ratio (D/d) should be more than or equal to 0.4 and less than or equal to 1.2.

EXAMPLE 4

In example 4, solid electrolytic capacitors C1 to C7 are produced in the same manner as in the method of the example 1 except that carrying out a process that a layer that includes amorphous niobium oxide are formed on a base body 1a made of niobium, and a surface layer 1b including crystalline niobium oxide is formed by heat treatment, instead of a process wherein a surface layer 1b made of crystalline niobium oxide is formed by oxidizing of the base body 1a made of niobium.

More specifically, the base body 1a is made of sintered porous niobium in the same manner as for example 1, by anode oxidizing by about 10V constant voltage in a phosphoric acid water solution of about 0.1 wt % which is held to about 60° C. for about 10 hours. By this process a layer made of amorphous niobium oxide is formed on base body 1a, thereby covering base body 1a.

Next, the base body 1a is heated to a temperature of about 220° C., about 250° C., about 400° C., about 600° C., about 800° C., about 900° C. or about 1000° C. under reduced pressure of $5*10^{-4}$ Pa for about 30 minutes, respectively so that the amorphous niobium oxide included in the layer 11b become crystallized and deoxidized. In this way, the layer 11b made of the amorphous niobium oxide is changed to surface layer 1b made of crystalline niobium oxide.

A process described as the first embodiment also can be applied. That is, the dielectric layer 2 made of amorphous niobium oxide, the electrolyte layer 3 including polypyrrole, and the cathode 4 including the first conductive layer 4a made of the carbon paste and the second conductive layer 4b made of silver paste can be formed sequentially. In this way the solid electrolytic capacitors C1 to C7 of the second example according to the present invention are prepared.

EXAMPLE 5

In example 5, solid electrolytic capacitor D1 is produced in the same manner as example 4 except base body 1a is made of an alloy containing niobium and aluminum of about 0.5 wt %, instead of using a base body 1a made of niobium.

Figure 13:
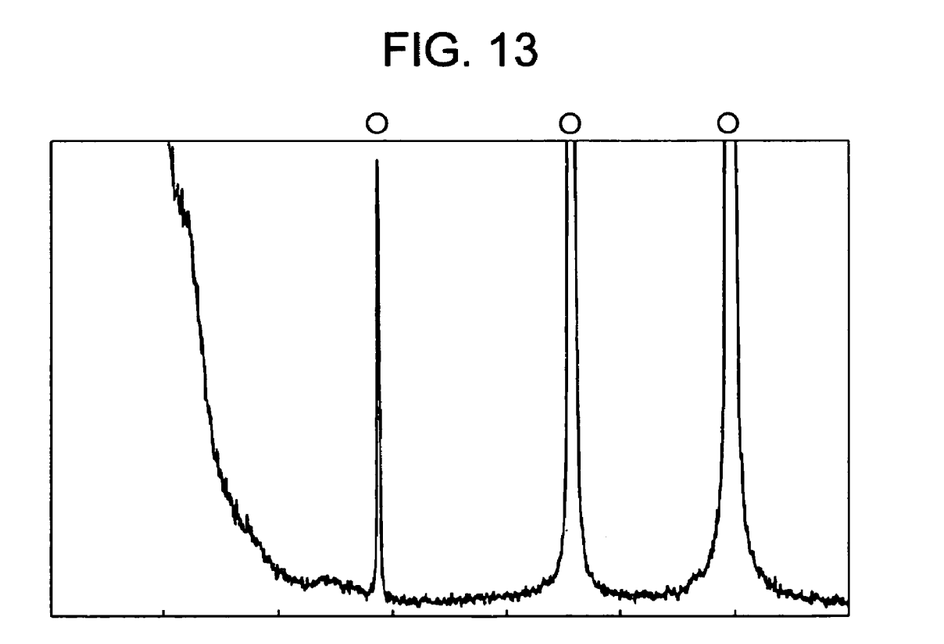
FIG. 13 is an X-ray diffraction pattern of anode 1 before treatment from example 4.
Figure 14:
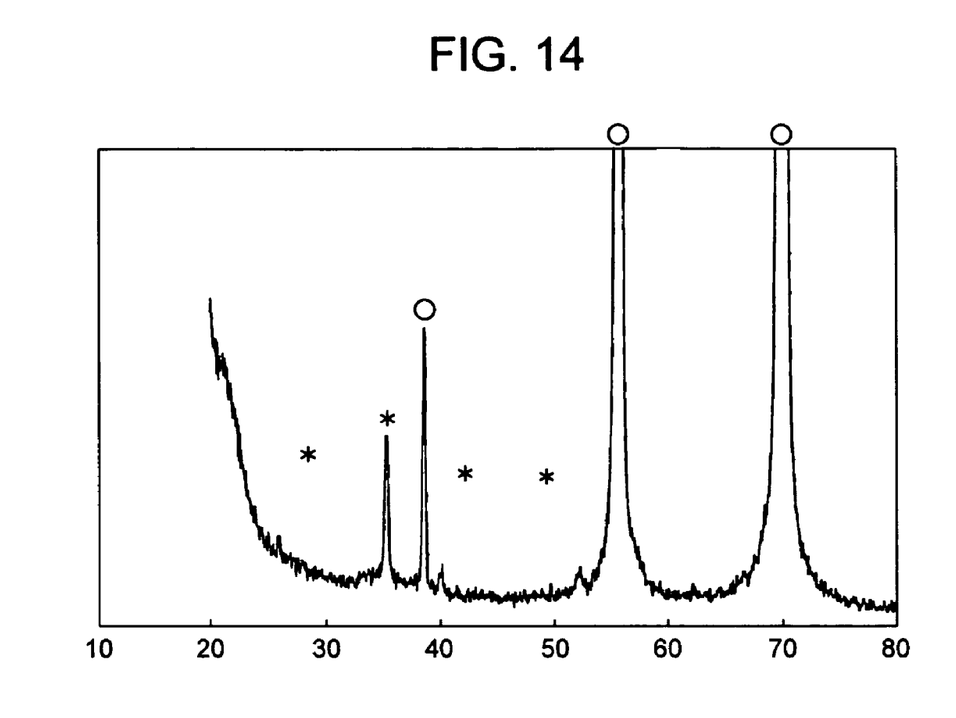
FIG. 14 is an X-ray diffraction pattern of anode 1 after oxidation of example 4.

The anode 1 of each process of example 4 is evaluated by X-ray diffraction with Cu—Kα ray in the same manner as example 1. FIG. 13 is an X-ray diffraction pattern of anode 1 before the heat treatment, and FIG. 14 is an X-ray diffraction pattern of the anode 1 after the oxidation of example 4 according to the present invention. The peak positions marked "O" correspond to niobium metal (Nb), and the peak positions marked "*" correspond to niobium oxide ($NbO_2$), respectively.

As shown in FIG. 13, only peaks of crystalline niobium metal (Nb) are shown, then layer 11b forms on the surface of base body 1a, which is considered to contain amorphous niobium oxide ($Nb_2O_5$).

Contrary to this, as shown in FIG. 14, peaks of crystalline niobium metal (Nb) and niobium oxide ($NbO_2$) appear in FIG. 14. Here the amorphous niobium oxide ($Nb_2O_5$) included in the layer 11b is crystallized and deoxidized, and surface layer 1b is considered to contain crystalline niobium oxide.

Figure 15:
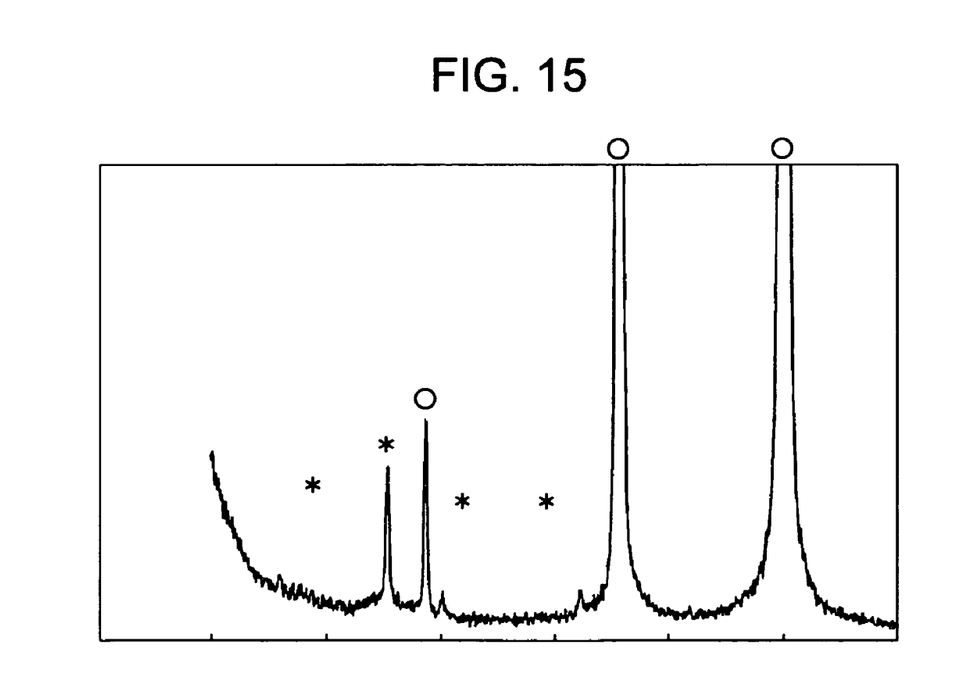
FIG. 15 is an X-ray diffraction pattern of anode 1 after dielectric layer formation from example 4.

FIG. 15 shows an X-ray diffraction pattern of the anode 1 after dielectric layer formation in example 4 of the present invention. In comparing FIG. 15 with FIG. 14, this change is not seen in an X-ray diffraction peak when the anodic oxidation is carried out again after heat-treatment, so the dielectric layer 2 of amorphous niobium oxide ($Nb_2O_5$) is considered to be formed on the surface layer 1b.

(Evaluation 3)

Solid electrolytic capacitors C1 to C7, D1 and X2 are heated to about 250° C. temperature for about 10 minutes in air. Before and after heating to about 250° C., about 120 Hz alternating current (VAC) is applied to an anode lead and an anode to measure capacitance at about 120 Hz frequency with a LCR meter. Also, leakage current is measured at about 5V voltage applied to the anode lead and the cathode a after about 20 seconds from applying. The results are shown in table 3.

Table 3 shows measured values of leakage current for each solid electrolytic capacitor and indexes of the leakage current when the index of the leakage current in the solid electrolytic capacitor X1 of the comparative example 1 is "100". In addition, the heat temperature for the furnace used for application of heat, the temperature to thermocouple installed near a sample holding jig in a furnace.

TABLE 3

| Capacitors | Temp. (C.) | Capacitance Before | Capacitance After | Leakage Current (µA) | Leakage Current (index) |
|---|---|---|---|---|---|
| C1 | 220 | 330 | 410 | 1000 | 50 |
| C2 | 250 | 330 | 363 | 600 | 30 |
| C3 | 400 | 330 | 338 | 250 | 12.5 |
| C4 | 600 | 330 | 335 | 200 | 10 |
| C5 | 800 | 330 | 340 | 220 | 11 |
| C6 | 900 | 330 | 365 | 450 | 22.5 |
| C7 | 1000 | 330 | 370 | 650 | 32.5 |
| D1 | 600 | 330 | 332 | 180 | 9 |

From these results, capacitance of the solid electrolytic capacitor X2 increases after heat treatment, compared with that of the solid electrolytic capacitor X2 before heat treatment, and the leakage current is relatively large. Oxygen in the dielectric layer diffused into the anode side during heat-treatment. In this way the thickness of the dielectric layer is considered to get thinner by the diffusion.

Contrary to this, the changes of capacitances of the solid electrolytic capacitors C1 to C7 and D1 before heat treatment and after heat treatment are very small, and the leakage current is relatively small. Especially, leakage current of the solid electrolytic capacitors C1 to C5 whose heat treatment are more than or equal to 250° C. and less than or equal to 800° C. are small. In this analysis, it is seen that the preferred heat-treatment temperature when the layer 11b made of amorphous niobium oxide is crystallized, is more than or equal to 250° C. and less than about 800° C., more preferably, more than equal to 400° C. and less than equal to 800° C.

In addition, leakage current of solid electrolytic capacitor D1 wherein the base body 1a consists of a niobium-aluminum alloy is approximately equal with a leakage current of solid electrolytic capacitor C4 that base body 1a consists of niobium. In this analysis it is understood that the base body 1a may contain other metals along with niobium.

This application is based upon and claims the benefit of priority from prior Japanese Patent Applications No. P2004-263424 filed on Sep. 10, 2004, and No. P2005-160281 filed on May 31, 2005, the entire contents of which are incorporated herein by reference.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A solid electrolytic capacitor, comprising:
    an anode, having a surface layer of crystalline niobium oxide on a base body that contains niobium;
    a dielectric layer of at least amorphous niobium oxide on the anode; and
    a cathode on the dielectric layer.

2. The solid electrolytic capacitor as claimed in claim 1, wherein the surface layer contains at least one of NbO and $NbO_2$.

3. The solid electrolytic capacitor as claimed in claim 1, wherein thickness of the surface layer (D) and thickness of the dielectric layer (d) are in ratio (D/d) less than 1.5 more than 0.05.

4. The solid electrolytic capacitor as claimed in claim 2, wherein thickness of the surface layer (D) and thickness of the dielectric layer (d) are in ratio (D/d) less than 1.5 more than 0.05.

5. A method of producing a solid electrolytic capacitor, comprising:
    forming a surface layer that contains crystalline niobium oxide on a base body that contains niobium;
    forming a dielectric layer that contains amorphous niobium oxide on the surface layer; and
    forming an cathode on the dielectric layer.

6. The method as claimed in claim 4, wherein forming the surface layer includes heat-treating the base body in an oxidizing atmosphere.

7. The method as claimed in claim 4, wherein forming the surface layer comprises:
    forming a layer that contains amorphous niobium oxide on the base body; and
    heat-treating the base body with the formed layer in an oxidizing atmosphere.

* * * * *